United States Patent
Onitsuka

(10) Patent No.: US 12,447,973 B2
(45) Date of Patent: Oct. 21, 2025

(54) VEHICLE EMERGENCY STOP SYSTEM, VEHICLE EMERGENCY STOP METHOD, AND VEHICLE EMERGENCY STOP PROGRAM

(71) Applicant: TOYOTA JIDOSHA KABUSHIKI KAISHA, Toyota (JP)

(72) Inventor: Masakatsu Onitsuka, Nisshin (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 281 days.

(21) Appl. No.: 18/325,387

(22) Filed: May 30, 2023

(65) Prior Publication Data

US 2024/0025417 A1     Jan. 25, 2024

(30) Foreign Application Priority Data

Jul. 19, 2022   (JP) ................................ 2022-114539

(51) Int. Cl.
*B60W 40/08* (2012.01)
*B60T 7/12* (2006.01)
*B60W 10/18* (2012.01)

(52) U.S. Cl.
CPC .............. *B60W 40/08* (2013.01); *B60T 7/12* (2013.01); *B60W 10/18* (2013.01); *B60W 2040/0818* (2013.01)

(58) Field of Classification Search
CPC ............... B60W 40/08; B60W 10/18; B60W 2040/0818; B60W 2030/082; B60W 30/18109; B60W 2540/10; B60W 2540/12; B60W 2540/16; B60W 2540/18; B60W 2720/106; B60W 2756/10; B60W 60/007; B60T 7/12; B60T 7/22
See application file for complete search history.

(56) References Cited

U.S. PATENT DOCUMENTS

| | | |
|---|---|---|
| 10,166,866 B2 | 1/2019 | Otake |
| 10,220,825 B2 | 3/2019 | Otake et al. |
| (Continued) | | |

FOREIGN PATENT DOCUMENTS

| | | |
|---|---|---|
| JP | 2009-163434 A | 7/2009 |
| JP | 2021-112983 A | 8/2021 |

*Primary Examiner* — Anne Marie Antonucci
*Assistant Examiner* — Patrick Daniel Mohl
(74) *Attorney, Agent, or Firm* — Sughrue Mion, PLLC

(57) ABSTRACT

Provided is a vehicle emergency stop system (1) including a control device configured to start execution of emergency stop control for causing an own vehicle to perform an emergency stop by performing braking control on the own vehicle when an operation of a driving operation device of the own vehicle is not detected for a predetermined time, and to end the execution of the emergency stop control when the operation is detected during the execution of the emergency stop control. The control device is configured to continue the emergency stop control when a collision between the own vehicle and an object is detected during the execution of the emergency stop control and the operation is detected within a first predetermined time from a first time point at which the collision is detected, and when the operation is detected during the execution of the emergency stop control and the collision is detected within a second predetermined time from a second time point at which the operation is detected.

6 Claims, 5 Drawing Sheets

(56) References Cited

U.S. PATENT DOCUMENTS

| | | |
|---|---|---|
| 10,239,537 B2 | 3/2019 | Otake |
| 10,589,743 B2 | 3/2020 | Otake |
| 11,021,156 B2 | 6/2021 | Uejima |
| 11,110,934 B2 | 9/2021 | Watanabe et al. |
| 11,299,153 B2 | 4/2022 | Tanaka |
| 2002/0169535 A1* | 11/2002 | Imai ................... B60R 21/0133 701/45 |
| 2016/0332622 A1* | 11/2016 | Shiraishi .................. B60T 7/22 |
| 2018/0134262 A1* | 5/2018 | Kurahashi .............. B60K 35/22 |
| 2018/0236971 A1* | 8/2018 | Ohachi .................. B60R 22/48 |
| 2021/0101589 A1* | 4/2021 | Jeon ..................... G05D 1/0061 |
| 2021/0221383 A1 | 7/2021 | Mase et al. |
| 2021/0362729 A1 | 11/2021 | Watanabe et al. |

\* cited by examiner

VEHICLE EMERGENCY STOP SYSTEM, VEHICLE EMERGENCY STOP METHOD, AND VEHICLE EMERGENCY STOP PROGRAM

BACKGROUND OF THE INVENTION

1. Field of the Invention

The present invention relates to a vehicle emergency stop system, a vehicle emergency stop method, and a vehicle emergency stop program for causing a vehicle to perform an emergency stop when a driver is unable to perform a driving operation.

2. Description of the Related Art

There is known a system which causes an own vehicle to perform an emergency stop when a driver is unable to perform a driving operation (when a level of consciousness (arousal level) of the driver is lower than a threshold value) (see, for example, Japanese Patent Application Laid-open No. 2009-163434). In general, this type of system (hereinafter referred to as "related-art system") monitors the level of consciousness of the driver. When the level of consciousness of the driver falls below the threshold value, the related-art system executes emergency stop control for, for example, controlling a braking device of the own vehicle to cause the own vehicle to decelerate and stop. The related-art system ends (stops) the execution of the emergency stop control when the driver returns to a state in which the driver can perform the driving operation (when the system detects that the level of consciousness of the driver exceeds the threshold value) during the execution of the emergency stop control. For example, the related-art system ends the execution of the emergency stop control when the system detects that a steering wheel or a brake pedal, for example, is operated during the execution of the emergency stop control.

Incidentally, when the own vehicle is traveling under a state in which the level of consciousness of the driver is lower than the threshold value, there may be a case in which a collision in which the own vehicle makes gentle contact with, for example, a guardrail or a pole (a collision which does not activate an airbag) occurs. In this case, a slight change may occur in, for example, a steering angle of a steering wheel or a depression depth of a brake pedal due to a change in the posture of the driver as a result of the impact caused by the collision. In this case, in the related-art system, the change in, for example, the steering angle or the depression depth caused by the collision may trigger the system to end the emergency stop control even though the level of consciousness of the driver remains low. Therefore, in the related-art system, there is room for improvement from the viewpoint of safety.

SUMMARY OF THE INVENTION

One object of the present invention is to provide a vehicle emergency stop system with which the safety of an own vehicle can be further improved.

In order to solve the above-mentioned problem, according to at least one embodiment of the present invention, there is provided a vehicle emergency stop system (1) including a control device (10) configured to start execution of emergency stop control for causing an own vehicle (V) to perform an emergency stop by performing braking control on the own vehicle when an operation of a driving operation device (AP, BP, SL, SW) of the own vehicle is not detected for a predetermined time (Tth0), and to end the execution of the emergency stop control when the operation is detected during the execution of the emergency stop control. The control device is configured to continue the emergency stop control when a collision between the own vehicle and an object is detected during the execution of the emergency stop control and the operation is detected within a first predetermined time (Txth) from a first time point (tx0) at which the collision is detected, and when the operation is detected during the execution of the emergency stop control and the collision is detected within a second predetermined time (Tyth) from a second time point (ty0) at which the operation is detected.

In principle, the control device of the vehicle emergency stop system according to the at least one embodiment of the present invention ends the execution of the emergency stop control when the control device detects that the driving operation device has been operated during the execution of the emergency stop control. There may be a case in which the control device detects that the driving operation device has been operated within a predetermined short period of time after the control device detects that the own vehicle has collided with an object. In this case, there is a possibility that the driving operation device has been operated merely due to the collision between the own vehicle and the object, and the driver is unable to perform the driving operation. Therefore, in this case, the control device continues the emergency stop control. In addition, even when the driving operation device is operated due to the collision, the order in which the collision is detected and the operation is detected by the control device may be reversed depending on, for example, the speed of communication between a sensor detecting the operation and the control device and the order in which the control device performs calculations. That is, there may be a case in which the control device first detects that the driving operation device has been operated, and then detects that the own vehicle has collided with an object. Therefore, when the control device detects that the driving operation device has been operated within a predetermined short period of time before detecting that the own vehicle has collided with an object, the control device continues the emergency stop control. Thus, the control device continues the emergency stop control when there is a high possibility that the driving operation device has been unintentionally operated by the driver. As a result, the safety of the own vehicle can be improved.

In the vehicle emergency stop system according to one aspect of the present invention, the control device is configured to end the execution of the emergency stop control when the operation is detected after the first predetermined time has elapsed from the first time point, and when the collision is detected after the second predetermined time has elapsed from the second time point.

With this configuration, the emergency stop control can be ended when there is a high possibility that the driving operation device has been operated intentionally by the driver.

In the vehicle emergency stop system according to another aspect of the present invention, the control device is configured to determine that the own vehicle has collided with an object when a magnitude of an acceleration of the own vehicle is within a predetermined range which exceeds an acceleration range which occurs during normal travel and is equal to or smaller than a predetermined threshold value, and an integral value of the magnitude of the acceleration within a predetermined time from a time point at which the magnitude of the acceleration of the own vehicle exceeds a lower limit value of the predetermined range exceeds a threshold value.

With this configuration, the control device can determine that a gentle collision in which the own vehicle gently collided with an object has occurred. In the case of a gentle collision, an airbag device may not activate. The control device continues the emergency stop control when the control device detects that the driving operation device has been operated within a predetermined time immediately before or immediately after the time point at which the above-mentioned gentle collision occurred. Therefore, with this aspect, the safety of the own vehicle can be improved compared to a system which ends the emergency stop control at the time point at which the system detects that the driving operation device has been operated in a situation in which the airbag device is not activated regardless of the presence or absence of a gentle collision.

Further, a vehicle emergency stop method and a vehicle emergency stop program according to at least one embodiment of the present invention include steps executed by each device included in the above-mentioned vehicle emergency stop system. With the vehicle emergency stop method and the vehicle emergency stop program, the safety of the own vehicle can be improved.

DESCRIPTION OF THE EMBODIMENTS (Outline)

Figure 1:
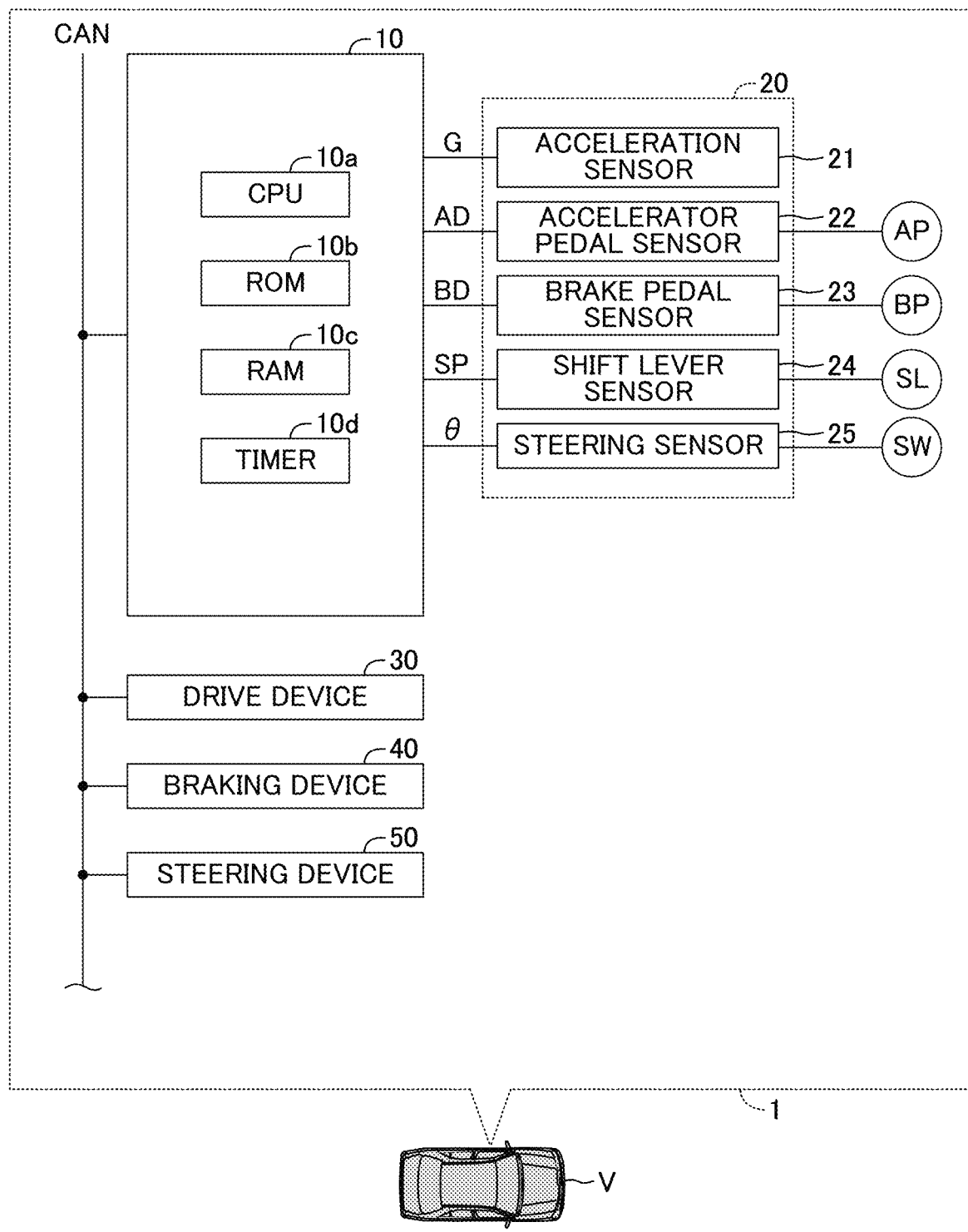
FIG. 1 is a block diagram of a vehicle emergency stop system according to at least one embodiment of the present invention.

As illustrated in FIG. 1, a vehicle emergency stop system 1 according to at least one embodiment of the present invention is mounted on a vehicle V (hereinafter referred to as "own vehicle") having an automatic driving function. When the vehicle emergency stop system 1 determines that a state in which a driver has not performed a driving operation has continued for more than a predetermined threshold time, the vehicle emergency stop system 1 causes the vehicle to perform an emergency stop (emergency stop function).

(Specific Configuration)

As illustrated in FIG. 1, the vehicle emergency stop system 1 includes an emergency stop ECU 10, in-vehicle sensors 20, a drive device 30, a braking device 40, and a steering device 50.

The emergency stop ECU 10 includes a microcomputer including, for example, a CPU 10a, a ROM 10b, a RAM 10c, and a timer 10d. The timer 10d includes a plurality of counter circuits, each of which is for measuring a time (for example, times T0, T1, Tx, and Ty, which are described later).

The emergency stop ECU 10 is connected via a controller area network (CAN) to other ECUs mounted on the own vehicle.

The in-vehicle sensors 20 include sensors (operation sensors) for acquiring information on a travel state of the own vehicle and information on the operation of a driving operation device (for example, accelerator pedal AP, brake pedal BP, shift lever SL, and steering wheel SW) arranged in the own vehicle.

Specifically, the in-vehicle sensors 20 include an acceleration sensor 21, an accelerator pedal sensor 22, a brake pedal sensor 23, a shift lever sensor 24, and a steering sensor 25.

The acceleration sensor 21 detects an acceleration G of the own vehicle (for example, an acceleration in a width direction of the own vehicle, and an acceleration in a longitudinal direction of the own vehicle). The acceleration sensor 26 transmits data representing the acceleration G to the emergency stop ECU 10.

The accelerator pedal sensor 22 detects a depression depth AD of an accelerator pedal AP of the own vehicle. The accelerator pedal sensor 22 transmits data representing the depression depth AD of the accelerator pedal to the emergency stop ECU 10.

The brake pedal sensor 23 detects a depression depth BD of a brake pedal BP of the own vehicle. The brake pedal sensor 23 transmits data representing the depression depth BD to the emergency stop ECU 10.

The shift lever sensor 24 detects a position (shift lever position SP) of a shift lever SL of the own vehicle. The shift lever sensor 24 transmits data representing the shift lever position SP to the emergency stop ECU 10.

The steering sensor 25 detects a steering angle (also referred to "steered angle" or "turning angle") θ of the steering wheel SW of the own vehicle. The steering sensor 25 transmits data representing the steering angle θ to the emergency stop ECU 10. Further, the steering sensor 25 includes a touch sensor incorporated in the steering wheel SW. The touch sensor detects whether or not the driver is gripping the steering wheel SW. The steering sensor 25 transmits data representing the detection result of the touch sensor to the emergency stop ECU 10.

The drive device 30 applies a driving force to drive wheels among wheels (left front wheel, right front wheel, left rear wheel, and right rear wheel). The drive device 30 includes, for example, an engine ECU, an internal combustion engine, a transmission, and a driving force transmission mechanism which transmits the driving force to the wheels. The internal combustion engine includes an actuator which drives a throttle valve. The engine ECU acquires information representing the driving force from another ECU, and drives the actuator of the internal combustion engine based on the acquired information. In this manner, the driving force to be applied to the drive wheels is controlled. The driving force generated by the internal combustion engine is transmitted to the drive wheels via the transmission and the driving force transmission mechanism.

When the vehicle to which the vehicle emergency stop system 1 is applied is a hybrid electric vehicle (HEV), the engine ECU can control the driving force of the vehicle generated by any one or both of "an internal combustion engine and an electric motor" serving as a vehicle drive source. Further, when the vehicle to which the vehicle emergency stop system 1 is applied is a battery electric vehicle (BEV), an electric motor ECU which controls the driving force of the vehicle generated by an "electric motor" serving as the vehicle drive source may be used instead of the engine ECU.

The braking device 40 applies a braking force to the wheels (brake discs). The braking device 40 includes, for example, a brake ECU and a brake caliper. The brake caliper includes an actuator which presses a brake pad against a brake disc. The brake ECU acquires information representing the braking force from another ECU, and drives the actuator of the brake caliper based on the acquired information. In this way, the braking force applied to the wheels (brake discs) is controlled.

The steering device 50 controls the steered angle of each steered wheel (left front wheel and right front wheel). The steering device 50 includes, for example, a steering ECU and a steering mechanism. The steering mechanism is a link mechanism including, for example, a knuckle arm and a tie rod. The steering device 50 further includes an actuator which drives the steering mechanism to change the steered angle. The steering ECU acquires information representing the steered angle from another ECU, and drives the actuator based on the acquired information. In this way, the steered angle of each steered wheel is controlled.

(Emergency Stop Function)

The emergency stop ECU 10 causes the timer 10*d* to measure the time T0 during which the driver has not performed a driving operation while the own vehicle is traveling. Specifically, when the emergency stop ECU 10 detects that an ignition switch of the own vehicle has been set to an ON state, the emergency stop ECU 10 activates the timer 10*d* and starts measuring the time T0. The emergency stop ECU 10 sequentially acquires the depression depth AD, the depression depth BD, the shift lever position SP, and the steering angle θ from the accelerator pedal sensor 22, the brake pedal sensor 23, the shift lever sensor 24, and the steering sensor 25 (operation sensors), and monitors changes in those physical quantities (operation information). When the emergency stop ECU 10 detects that there has been a change in any one or a plurality of the physical quantities (operation information) (that is, detects that the driving operation device has been operated), the emergency stop ECU 10 resets the timer 10*d*. Specifically, the emergency stop ECU 10 sets the time T0 to "0", and again causes the timer 10*d* to start measuring the time T0.

When the time T0 reaches a threshold value Tth0, the emergency stop ECU 10 starts first emergency stop control for controlling the braking device 40 so that the acceleration G in the traveling direction of the own vehicle matches a predetermined first target value α1 (<0). In this case, the emergency stop ECU 10 causes the timer 10*d* to continue measuring the time T1, which is the elapsed time after the start of the first emergency stop control. Then, when the time T1 reaches a threshold value Tth1, the emergency stop ECU 10 starts second emergency stop control for controlling the braking device 40 so that the acceleration G in the traveling direction of the own vehicle matches a predetermined second target value α2 (<α1). The emergency stop ECU 10 decelerates the own vehicle in the manner described above by changing the acceleration G step by step in accordance with the time Tx in which a state in which a driving operation has not been performed has continued.

When the emergency stop ECU 10 detects that the driving operation device has been operated during the execution of the first emergency stop control or the second emergency stop control (hereinafter simply referred to as "emergency stop control"), in principle, the emergency stop ECU 10 ends the execution of the emergency stop control, and resets the timer 10*d*. However, as described below, even when it is detected that the driving operation device has been operated, the emergency stop ECU 10 continues the emergency stop control in cases in which a predetermined condition is satisfied (see FIG. 2A and FIG. 2B).

The emergency stop ECU 10 sequentially determines whether or not the own vehicle has gently collided with an object such as a guardrail or a pole based on the acceleration G. Specifically, for example, the emergency stop ECU 10 determines that the own vehicle has gently collided with an object when "a magnitude of the acceleration G is within a predetermined range GA, and an integral value of the magnitude of the acceleration G within a predetermined time from a time point at which the magnitude of the acceleration G exceeds a lower limit value (>0) of the range GA exceeds a threshold value." The range GA is set in advance as a predetermined range which is larger than the acceleration generated in a normal driving state (sudden deceleration (frontal G), sudden acceleration (rear G), sharp turn (lateral G), and road surface vibration (vertical G)) and is equal to or less than an upper limit threshold value of the acceleration that can be considered to be a gentle collision. For example, when the own vehicle collides with an object, in a case in which an airbag mounted in the own vehicle is not deployed, the collision can often be considered to correspond to a "gentle collision."

Figure 2A:
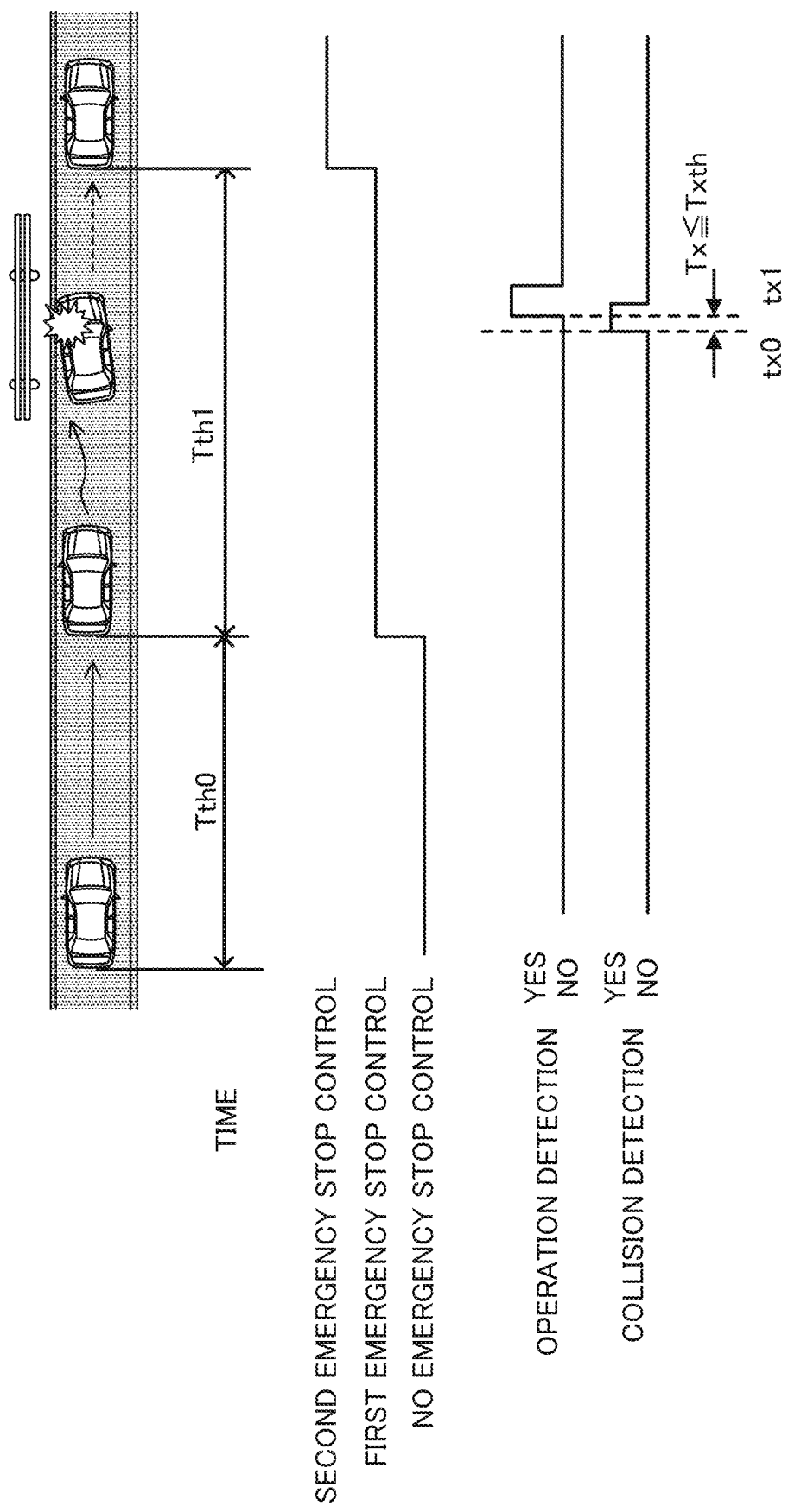
FIG. 2A is a timing chart for illustrating emergency stop control in a first situation (S1).

FIG. 2A is a diagram for illustrating a state in which "the emergency stop ECU 10 detects that there has been a gentle collision between the own vehicle and an object after the emergency stop control (first emergency stop control) is started, but before an operation of the driving operation device is detected." In FIG. 2A, the emergency stop ECU 10 starts the first emergency stop control at the time point at which the time T0 measured by the timer 10*d* reaches the threshold value Tth0. During the execution of the first emergency stop control, when the emergency stop ECU 10 detects a gentle collision between the own vehicle and an object, the emergency stop ECU 10 causes the timer 10*d* to start measuring the time Tx which has elapsed since a time tx0 at which the own vehicle gently collided with the object. Then, when the emergency stop ECU 10 detects that the driving operation device has been operated during the execution of the emergency stop control (before the own vehicle stops), the emergency stop ECU 10 acquires the time Tx from the timer 10*d* at the time tx1 at which the operation is detected. Then, when the time Tx is equal to or less than a threshold value Txth, the emergency stop ECU 10 continues the emergency stop control. Meanwhile, when the time Tx exceeds the threshold value Txth, the emergency stop ECU 10 ends (stops) the execution of the emergency stop control.

Figure 2B:
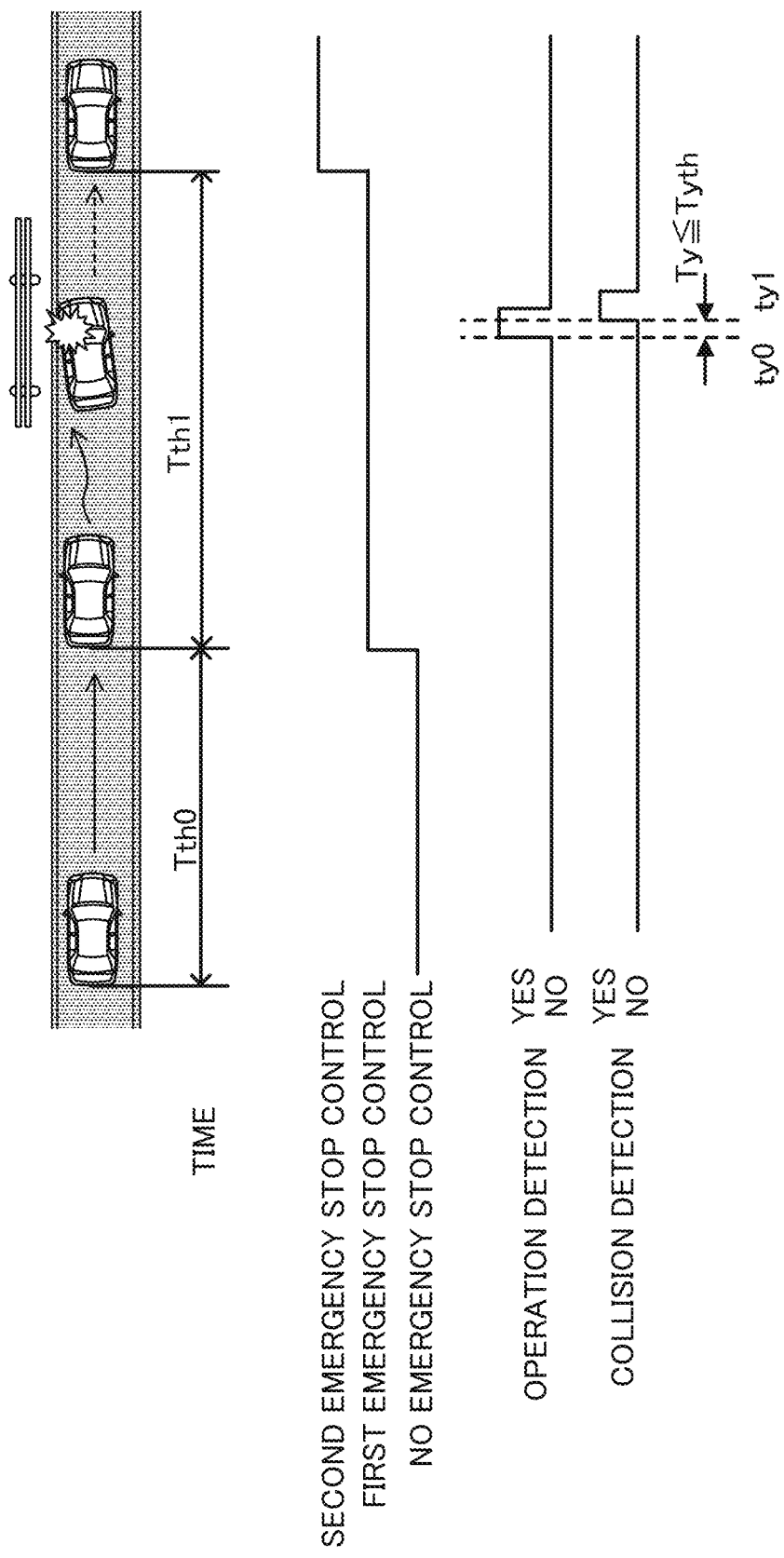
FIG. 2B is a timing chart for illustrating emergency stop control in a second situation (S2).

FIG. 2B is a diagram for illustrating a state in which "the emergency stop ECU 10 detects that the driving operation device has been operated after the emergency stop control (first emergency stop control) is started, but before a gentle collision between the own vehicle and an object is detected." In FIG. 2B, the emergency stop ECU 10 starts the first emergency stop control at the time point at which the time T0 reaches the threshold value Tth0. During the execution of the first emergency stop control, when the emergency stop ECU 10 detects that the driving operation device has been operated, the emergency stop ECU 10 causes the timer 10*d* to start measuring the time Ty which has elapsed since a time ty0 at which an operation of the driving operation device is detected. Then, when the emergency stop ECU 10 detects a gentle collision between the own vehicle and an object during the execution of the emergency stop control (before the own vehicle stops), the emergency stop ECU 10 acquires the time Ty from the timer 10d at the time point at which the gentle collision is detected. Then, when the time Ty is equal to or less than a threshold value Tyth, the emergency stop ECU 10 continues the emergency stop control. Meanwhile, when the time Ty exceeds the threshold value Tyth, the emergency stop ECU 10 ends (stops) the execution of the emergency stop control. The threshold value Tyth is smaller than the threshold value Txth.

In a case in which the emergency stop control is not executed, and in a case in which the acceleration G detected by the acceleration sensor 21 exceeds the above-mentioned range GA when the first emergency stop control is executed (case in which the collision between the own vehicle and the object produces a relatively large impact), the emergency stop ECU 10 immediately starts the second emergency stop control.

Figure 3:
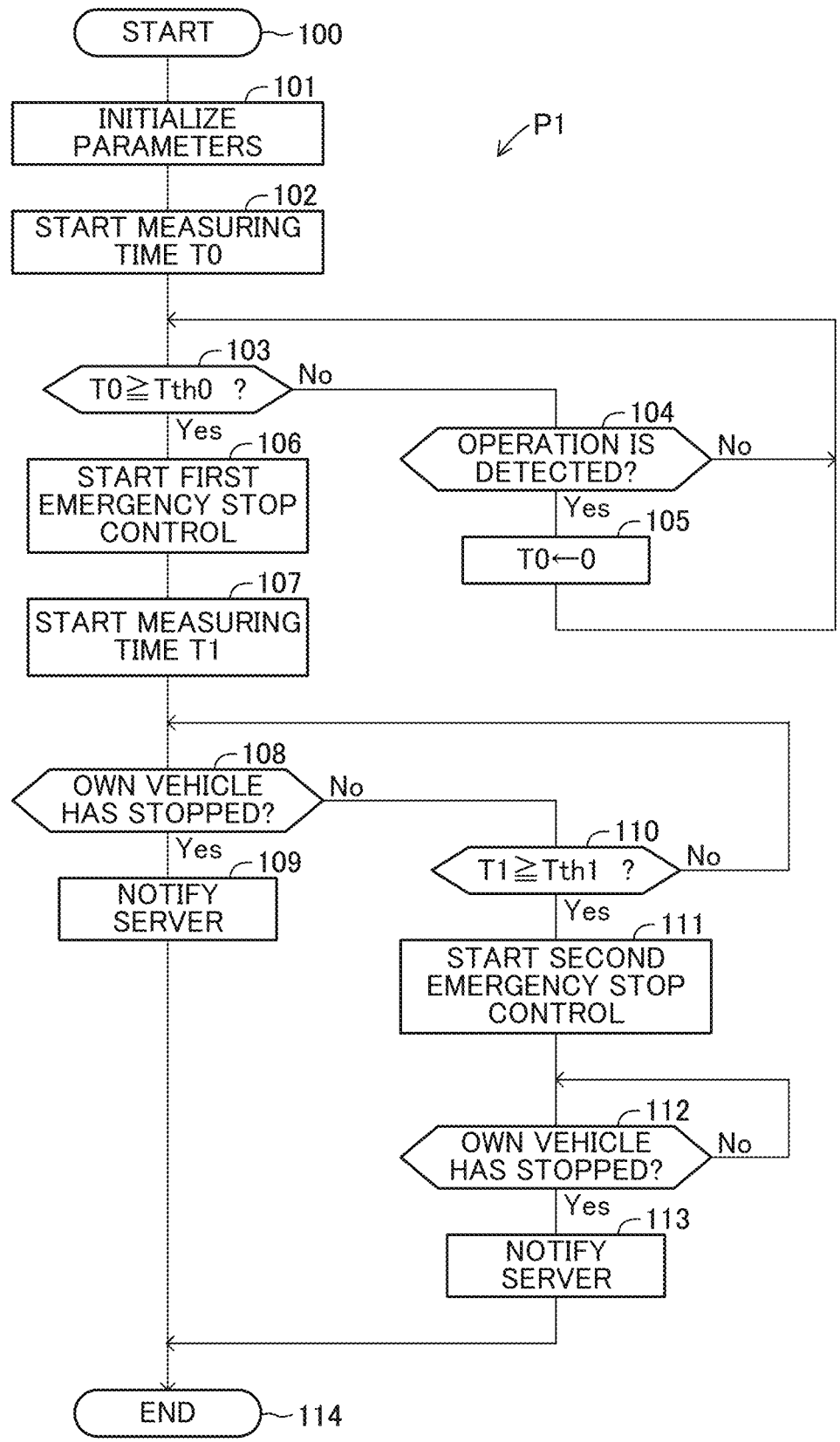
FIG. 3 is a flowchart of a program for starting first emergency stop control and second emergency stop control.
Figure 4:
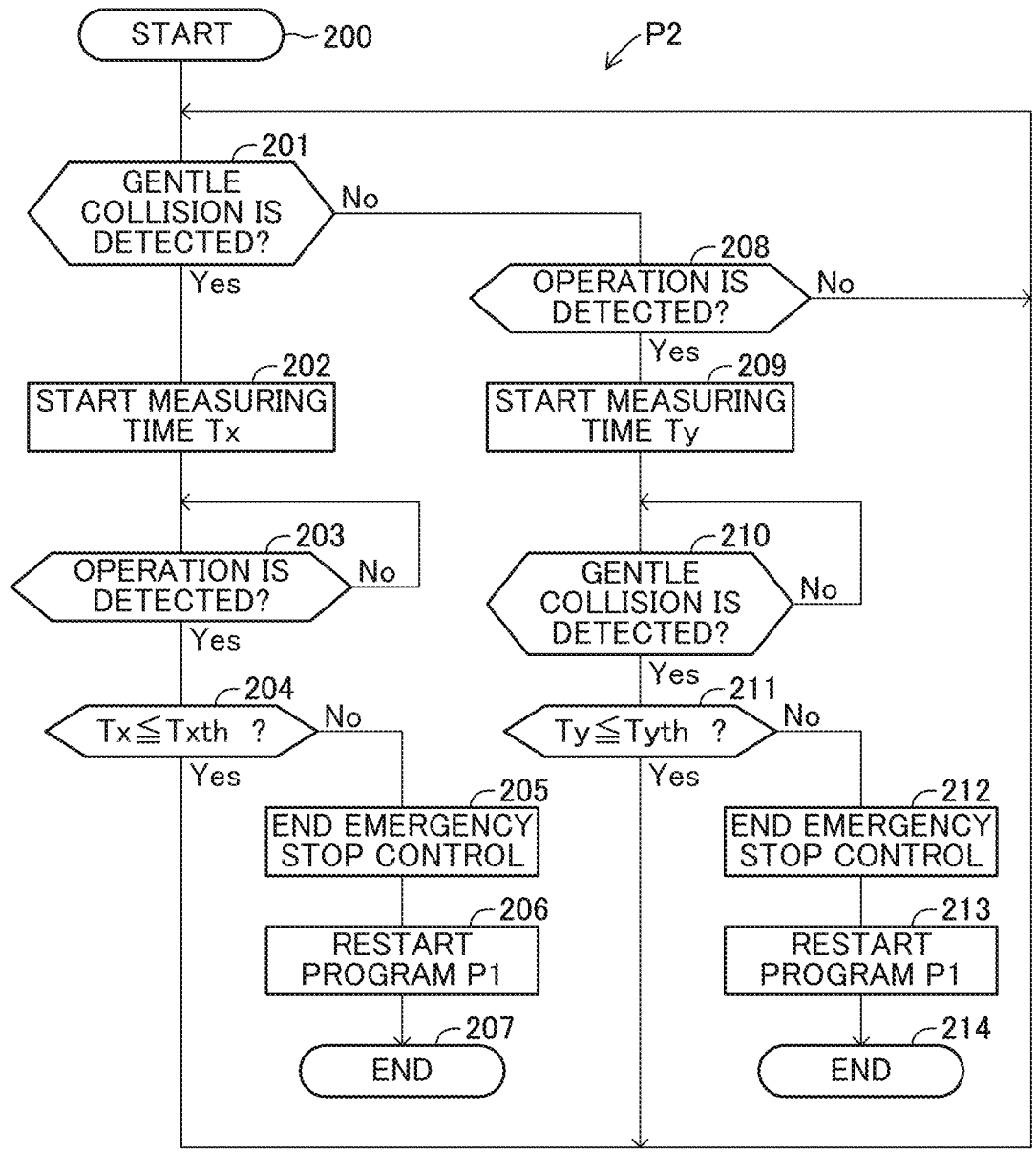
FIG. 4 is a flowchart of a program for determining whether or not to continue the emergency stop control being executed.

Next, with reference to FIG. 3 and FIG. 4, operation (programs (program P1 and program P2) for implementing the emergency stop function) of the CPU 10a (hereinafter simply referred to as "CPU") of the emergency stop ECU 10 is specifically described. When the CPU detects that the ignition switch of the own vehicle has been turned from an OFF state to the ON state, the CPU starts executing the program P1. Further, when the CPU starts executing the first emergency stop control, the CPU starts executing the program P2.

(Program P1)

The CPU starts executing the program P1 from Step 100, and advances the process to Step 101.

In Step 101, the CPU initializes various parameters. Specifically, the CPU sets the times T0, T1, Tx, and Ty to "0". Then, the CPU advances the process to Step 102.

In Step 102, the CPU causes the timer 10d to start measuring the time T0, and advances the process to Step 103.

In Step 103, the CPU determines whether or not the time T0 is equal to or more than the threshold value Tth0. When the time T0 is equal to or more than the threshold value Tth0 ("Yes" in Step 103), the CPU advances the process to Step 106. Meanwhile, when the time T0 is less than the threshold value Tth0 ("No" in Step 103), the CPU advances the process to Step 104.

In Step 104, the CPU determines whether or not the CPU has detected that the driving operation device has been operated (whether or not the CPU has detected an operation). When the CPU has detected an operation ("Yes" in Step 104), the CPU advances the process to Step 105. Meanwhile, when the CPU has not detected an operation ("No" in Step 104), the CPU returns the process to Step 103.

In Step 105, the CPU sets the time T0 to "0", and returns the process to Step 103.

In Step 106, the CPU starts the first emergency stop control. That is, the CPU controls the braking device 40 so that the acceleration G matches the first target value α1. Then, the CPU advances the process to Step 107.

In Step 107, the CPU causes the timer 10d to start measuring the time T1. Then, the CPU advances the process to Step 108.

In Step 108, the CPU determines whether or not the own vehicle has stopped. When the own vehicle has stopped ("Yes" in Step 108), the CPU advances the process to Step 109. Meanwhile, when the own vehicle is still traveling ("No" in Step 108), the CPU advances the process to Step 110.

In Step 109, the CPU notifies a predetermined server computer via a wireless communication line that the own vehicle has performed an emergency stop. Then, the CPU advances the process to Step 114, and ends the program P1.

In Step 110, the CPU determines whether or not the time T1 is equal to or more than the threshold value Tth1. When the time T1 is equal to or more than the threshold value Tth1 ("Yes" in Step 110), the CPU advances the process to Step 111. Meanwhile, when the time T1 is less than the threshold value Tth1 ("No" in Step 110), the CPU returns the process to Step 108.

In Step 111, the CPU starts the second emergency stop control. That is, the CPU controls the braking device 40 so that the acceleration G matches the second target value α2. Then, the CPU advances the process to Step 112.

In Step 112, the CPU determines whether or not the own vehicle has stopped. When the own vehicle has stopped ("Yes" in Step 112), the CPU advances the process to Step 113. Meanwhile, when the own vehicle is still traveling ("No" in Step 112), the CPU returns the process to Step 112.

In Step 113, the CPU notifies the predetermined server computer via the wireless communication line that the own vehicle has performed an emergency stop. Then, the CPU advances the process to Step 114, and ends the program P1.

(Program P2)

When the CPU starts the program P2 in Step 200 after the start of the first emergency stop control, the CPU advances the process to Step 201.

In Step 201, the CPU determines whether or not the CPU has detected that the own vehicle has gently collided with an object (whether or not the CPU has detected a gentle collision). When the CPU has detected a gentle collision ("Yes" in Step 201), the CPU advances the process to Step 202. Meanwhile, when the CPU has not detected a gentle collision ("No" in Step 201), the CPU advances the process to Step 208.

In Step 202, the CPU causes the timer 10d to start measuring the time Tx. Then, the CPU advances the process to Step 203.

In Step 203, the CPU determines whether or not the CPU has detected that the driving operation device has been operated (whether or not the CPU has detected an operation). When the CPU has detected an operation ("Yes" in Step 203), the CPU advances the process to Step 204. Meanwhile, when the CPU has not detected an operation ("No" in Step 203), the CPU returns the process to Step 203.

In Step 204, the CPU determines whether or not the time Tx is equal to or less than the threshold value Txth. When the time Tx is equal to or less than the threshold value Txth ("Yes" in Step 204), the CPU returns the process to Step 201. That is, the CPU determines that there is a high possibility that the detected operation is caused by a gentle collision and that the driver is unable to perform the driving operation, and the CPU continues the emergency stop control. Meanwhile, when the time Tx exceeds the threshold value Txth ("No" in Step 204), the CPU determines that the driver can perform the driving operation, and advances the process to Step 205.

In Step 205, the CPU ends (stops) the emergency stop control (the first emergency stop control or the second emergency stop control being executed), and advances the process to Step 206.

In Step 206, the CPU forcibly ends the program P1, and starts executing the program P1 again. Then, the CPU advances the process to Step 207, and ends the program P2.

In Step 208, the CPU determines whether or not the CPU has detected that the driving operation device has been operated (whether or not the CPU has detected an operation). When the CPU has detected an operation ("Yes" in Step 208), the CPU advances the process to Step 209. Meanwhile, when the CPU has not detected an operation ("No" in Step 208), the CPU returns the process to Step 201.

In Step 209, the CPU causes the timer 10d to start measuring the time Ty. Then, the CPU advances the process to Step 210.

In Step 210, the CPU determines whether or not the CPU has detected that the own vehicle has gently collided with an object (whether or not the CPU has detected a gentle collision). When the CPU has detected a gentle collision ("Yes" in Step 210), the CPU advances the process to Step 211. Meanwhile, when the CPU has not detected a gentle collision ("No" in Step 210), the CPU returns the process to Step 210.

In Step 211, the CPU determines whether or not the time Ty is equal to or less than the threshold value Tyth. When the time Ty is equal to or less than the threshold value Tyth ("Yes" in Step 211), the CPU returns the process to Step 201. That is, the CPU determines that there is a high possibility that the detected operation is caused by a gentle collision and that the driver is unable to perform the driving operation, and the CPU continues the emergency stop control. Meanwhile, when the time Ty exceeds the threshold value Tyth ("No" in Step 211), the CPU determines that the driver can perform the driving operation, and advances the process to Step 212.

In Step 212, the CPU ends (stops) the emergency stop control (the first emergency stop control or the second emergency stop control being executed), and advances the process to Step 213.

In Step 213, the CPU forcibly ends the program P1, and starts executing the program P1 again. Then, the CPU advances the process to Step 214, and ends the program P2.

Further, the CPU executes a program (not shown) which monitors whether or not the acceleration G exceeds the range GA (whether or not a relatively large impact has occurred). When the CPU detects a relatively large impact, the CPU ends (stops) the program P1 and the program P2, and starts the second emergency stop control.

(Effects)

As described above, in principle, the emergency stop ECU 10 ends the execution of the emergency stop control when the emergency stop ECU 10 detects that the driving operation device has been operated during the execution of the emergency stop control. There may be a case in which the emergency stop ECU 10 detects that the driving operation device has been operated within a short period of time after detecting that the own vehicle has gently collided with an object. In this case, there is a possibility that the driving operation device has been operated merely due to the gentle collision, and the driver is unable to perform the driving operation. Therefore, in this case, the emergency stop ECU 10 continues the emergency stop control. In addition, even when the driving operation device is operated due to the gentle collision, the order in which the collision is detected and the operation is detected by the emergency stop ECU 10 may be reversed depending on, for example, the speed of communication between the in-vehicle sensors 20 and the emergency stop ECU 10 and the order in which the emergency stop ECU 10 performs calculations. That is, there may be a case in which the emergency stop ECU 10 first detects that the driving operation device has been operated, and then detects that the own vehicle has gently collided with an object. Therefore, when the emergency stop ECU 10 detects that the driving operation device has been operated within a predetermined short period of time before detecting that the own vehicle has gently collided with an object, the emergency stop ECU 10 continues the emergency stop control. As described above, the emergency stop ECU 10 continues the emergency stop control when there is a high possibility that the driving operation device has been unintentionally operated by the driver. As a result, the safety of the own vehicle can be improved.

The present invention is not limited to the at least one embodiment described above, and various modification examples can be adopted within the scope of the present invention as described below.

Modification Example 1

In the at least one embodiment of the present invention described above, as the emergency stop control, the emergency stop ECU 10 causes the own vehicle to decelerate by controlling the braking device 40, but in addition to this operation, the emergency stop ECU 10 may cause the own vehicle to move to a predetermined region (for example, the shoulder of the road) by controlling the steering device 50.

Modification Example 2

In the at least one embodiment of the present invention described above, the emergency stop ECU 10 increases the acceleration G step by step in the process of stopping the own vehicle. In place of this operation, the emergency stop ECU 10 may maintain the acceleration G constant during the process of stopping the own vehicle.

The vehicle V may be an autonomous vehicle.

What is claimed is:

1. A vehicle emergency stop system, comprising a control device configured to start execution of emergency stop control for causing an own vehicle to perform an emergency stop by performing braking control on the own vehicle when an operation of a driving operation device of the own vehicle is not detected for a predetermined time, and to end the execution of the emergency stop control when the operation is detected during the execution of the emergency stop control, the control device being configured to continue the emergency stop control when a collision between the own vehicle and an object is detected during the execution of the emergency stop control and the operation is detected within a first predetermined time from a first time point at which the collision is detected, and when the operation is detected during the execution of the emergency stop control and the collision is detected within a second predetermined time from a second time point at which the operation is detected, and the control device being configured to determine that a driver of the own vehicle is in a low-consciousness state when one of the collision and the operation is detected first and then the other of the collision and the operation is detected within a threshold time thereafter, and continue the emergency stop control based on determining that the driver is in the low-consciousness state.

2. The vehicle emergency stop system according to claim 1, wherein the control device is configured to end the execution of the emergency stop control when the operation is detected after the first predetermined time has elapsed from the first time point, and when the collision is detected after the second predetermined time has elapsed from the second time point.

3. The vehicle emergency stop system according to claim 1, wherein the control device is configured to determine that the own vehicle has gently collided with an object when a magnitude of an acceleration of the own vehicle is within a predetermined range which exceeds an acceleration range which occurs during normal travel, and an integral value of the magnitude of the acceleration within a third predetermined time from a time point at which the magnitude of the acceleration of the own vehicle exceeds a lower limit value of the predetermined range exceeds a threshold value.

4. The vehicle emergency stop system according to claim 1, wherein
in a case in which the collision is detected first, the threshold time is set to a first value,
in a case in which the operation is detected first, the threshold time is set to a second value, and
the second value is smaller than the first value.

5. A vehicle emergency stop method, comprising:
starting execution of emergency stop control for causing an own vehicle to perform an emergency stop by performing braking control on the own vehicle when an operation of a driving operation device of the own vehicle is not detected for a predetermined time and ending the execution of the emergency stop control when the operation is detected during the execution of the emergency stop control; and
continuing the emergency stop control when a collision between the own vehicle and an object is detected during the execution of the emergency stop control and the operation is detected within a first predetermined time from a first time point at which the collision is detected, and when the operation is detected during the execution of the emergency stop control and the collision is detected within a second predetermined time from a second time point at which the operation is detected,
wherein the vehicle emergency method further comprises:
determining that a driver of the own vehicle is in a low-consciousness state when one of the collision and the operation is detected first and then the other of the collision and the operation is detected within a threshold time thereafter, and
continuing the emergency stop control based on determining that the driver is in the low-consciousness state.

6. A non-transitory storage medium storing an emergency stop program for causing a computer of an own vehicle to execute:
starting execution of emergency stop control for causing the own vehicle to perform an emergency stop by performing braking control on the own vehicle when an operation of a driving operation device of the own vehicle is not detected for a predetermined time, and ending the execution of the emergency stop control when the operation is detected during the execution of the emergency stop control; and
continuing the emergency stop control when a collision between the own vehicle and an object is detected during the execution of the emergency stop control and the operation is detected within a first predetermined time from a first time point at which the collision is detected, and when the operation is detected during the execution of the emergency stop control and the collision is detected within a second predetermined time from a second time point at which the operation is detected,
wherein the computer of the own vehicle is further configured to execute:
determining that a driver of the own vehicle is in a low-consciousness state when one of the collision and the operation is detected first and then the other of the collision and the operation is detected within a threshold time thereafter, and
continuing the emergency stop control based on determining that the driver is in the low-consciousness state.

* * * * *